United States Patent [19]

Re et al.

[11] Patent Number: 5,043,410

[45] Date of Patent: Aug. 27, 1991

[54] CROSS-LINKABLE POLYURETHANE RUBBERS CONTAINING POLYOXYPERFLUOROALKYLENE BLOCKS

[75] Inventors: Alberto Re, Milan; Francesco Giavarini, Bergamo; Cesare Cova, Varese, all of Italy

[73] Assignee: Ausimont S.r.l., Milan, Italy

[21] Appl. No.: 407,735

[22] Filed: Sep. 15, 1989

[30] Foreign Application Priority Data

Sep. 15, 1988 [IT] Italy ................................ 21947 A/88

[51] Int. Cl.$^5$ .............................................. C08G 18/32
[52] U.S. Cl. ......................................... 528/70; 528/79; 528/88; 528/110; 528/485; 528/356
[58] Field of Search .................... 528/70, 110, 79, 88, 528/485; 525/356, 326.4, 403

[56] References Cited

U.S. PATENT DOCUMENTS

| | | | |
|---|---|---|---|
| 3,714,092 | 1/1973 | Mazzeo et al. | 528/74.5 |
| 4,508,916 | 4/1985 | Newell et al. | 556/420 |
| 4,699,969 | 10/1987 | Re et al. | 528/70 |
| 4,720,527 | 1/1988 | Caporiccio et al. | 525/403 |
| 4,782,130 | 11/1988 | Re et al. | 528/70 |
| 4,849,493 | 7/1989 | Re et al. | 528/70 |
| 4,948,844 | 8/1990 | Nakahara et al. | 525/356 |

FOREIGN PATENT DOCUMENTS 1395773  5/1975  United Kingdom .

*Primary Examiner*—John Kight, III
*Assistant Examiner*—Duc Truong
*Attorney, Agent, or Firm*—Stevens, Davis, Miller & Mosher

[57] ABSTRACT

Fluorinated polyurethanes containing blocks having a perfluoropolyethereal structure, with rubber-like properties, alternated with stiff structural units are taught. The stiff units are at least partially provided with a double bond of the olefinic type, which is suitable for causing the cross-linking of the polymeric chains with a cross-linking system of the radicalic type.

6 Claims, No Drawings

CROSS-LINKABLE POLYURETHANE RUBBERS CONTAINING POLYOXYPERFLUOROALKYLENE BLOCKS

FIELD OF THE INVENTION

The present invention relates to fluorinated polyurethanes having a glass transition temperature lower than −80° C. and characterized in that they can be transformed using known technology of conventional rubbers.

BACKGROUND OF THE INVENTION

Polyurethanes (PU) are known, which are characterized by the presence, in their structure, of polyoxyperfluoroalkylene blocks deriving from the uses of perfluoropolyethers having hydroxylated end groups.

Products of this type are described in particular in Italian Patent No. 903,446. They are characterized by a Tg lower than −80° C., wherefore they retain flexibility and elastic properties even at very low temperatures.

The structure of these materials is free from stiff segments. To have consistency, it is necessary to impart to them a three-dimension lattice by cross-linking them either with three-functional chemical agents or through the formation of allophenate or isocyanurate.

However, the materials so obtained do not possess an optimal combination of mechanical characteristics regarding hardness, tensile strength, modulus of elasticity and elongation. In particular, the hardness values are lower than 50 Shore A. The tensile strength values are generally lower than 10 kg/cm².

A substantial improvement in the aggregate of mechanical properties has been obtained using the introduction of encumbering blocks consisting of aromatic or cycloaliphatic diols as is illustrated in applicants prior European patent application no. 192,190. However, the obtained products do not exhibit an optimal combination of properties. In particular, the fluorinated polyurethanes obtained according to the process are characterized by tensile strength values which generally do not exceed 25 kg cm². Furthermore, the presence of aromatic diols in the structure is a limitation for the use thereof at high temperatures.

In these products, the modulus of elasticity undergoes considerable variations as a function of temperature, so that it sinks to very low values at temperatures close the melting temperatures.

The above references are hereby incorporated by reference.

DETAILED DESCRIPTION OF THE INVENTION

An object of the present invention is fluorinated polyurethanes having a Tg lower than −80° C. and being characterized by high mechanical properties (high hardness and tensile strength values). The fluorinated polymers of the invention are furthermore characterized by a dynamic mechanical spectrum which exhibits a constant trend of the modulus of elasticity in a wide temperature range and with high values. Preferred polyurethane elastomers are the ones showing a molecular weight comprised between 30,000 and 200,000.

The fluorinated polyurethanes according to the invention exhibit furthermore the characteristic of being processable according to technology utilized for conventional rubbers (extrusion, injection molding, processing in collander). In the known polyurethanes based on perfluoropolyethers, the above-mentioned mechanical characteristics are difficult to be obtained with structures of the thermoplastic (thermoelastomeric) type, as these materials usually exhibit a lower softening point than the one of the polyurethanes based on hydrogenated polyols. The introduction of polyfunctional chemical agents permits obviating this drawback, but limits the processability of these materials (processing carried out according to RIM technology or by casting).

Applicant has surprisingly found that it is possible to obtain the aggregate of characteristics described hereinabove by preparing polyurethanes having the particular structure indicated hereinafter.

The vulcanizable polyurethane elastomers forming the object of the present invention are high molecular weight polymers having an alternated block structure consisting of straight stiff segments and straight rubber-like segments and containing unsaturated groups which may give rise to cross-link through the formation of radicals. Therefore, vulcanizing systems based on peroxides or on sulphur or the irradiation using U.V. rays or electron beam are suitable.

These vulcanizable polyurethanes, as explained above, are processable according to the technology utilized for conventional rubbers.

As a consequence of the above vulcanization, fluorinated polyurethanes having an optimal combination of mechanical properties, as indicated above, are surprisingly obtained. In particular:

Tg less than −80° C., which means excellent elastic properties at very low temperatures;

high hardness, ranging in particular from 50 Shore A to 75 Shore D;

high tensile strength, higher than 30 kg/cm², in particular greater than or equal to 40 kg cm²;

constant trend of the modulus of elasticity in a wide temperature range, with values from about 4 to 10 N/mm² in the range from about −100° to +150° C.

The polyurethanes of the present invention, having a Tg lower than −80° C., are characterized by:

A) perfluoropolyethereal structure blocks exhibiting an average molecular weight from about 1,000 to 10,000 with rubber-like properties and consisting of sequences of fluorooxyalkylene units, which are random distributed in the perfluoropolyethereal chain and are selected from the following classes:

I) (CF₂CF₂O) and (CF₂O);

II)

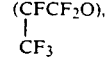

(CF₂CF₂O), (CFXO) where X is F or CF₃;

III) (CH₂CF₂CF₂O) in structures represented by the following formula:

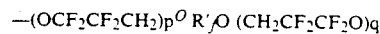

—(OCF₂CF₂CH₂)p $^O$ R$_f$O (CH₂CF₂CF₂O)q wherein R$_f$ is a fluoroaliphatic group (i.e. a fluoroalkylene group) which can contain in the chain one or more (i.e. from 2 to 4) hetheratoms such as oxygen and nitrogen, the fluoroaliphatic group having in the chain from 1 to 21, but preferably from 1 to 4 carbon atoms, particularly when R$_f$ is a fluoroalkylene group, p and q are integers, R$_f$, p and q being such that the molecular weight is in the above limits, p+q being greater than 2.

IV)

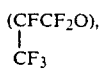

the units being bound to each other in the

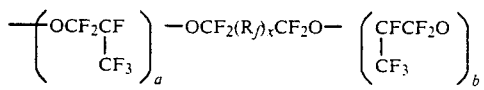

wherein $R_f$ is a group as defined in class III, x can be zero or 1, a and b are integers, $R_f$, x, a and b being such that the molecular weight is in the above stated limits, a+b being greater than 2.

It is possible also to use diols with repeating units $-CF_2CF_2O-$, $-CF_2CF_2CF_2O-$, $-CF(CF_3)CF_2O-$. These products are prepared using the process described in the applicants U.S. Pat. No. 4,720,527, hereby incorporated by reference.

The perfluoropolyethereal-structure blocks may derive from the use of a perfluoropolyethereal diol or from the use of a perfluoropolyethereal diisocyanate, functional groups —OH or —NCO being at both ends. Preferably but not necessarily the average number of said rubber-like blocks is from 3 to 200 per molecule of polyurethane.

B) Segments of the stiff type containing a double bond of the olefinic type and deriving from a short-chain (up to 14 carbon atoms) unsaturated diol. In particular, it is possible to use cis-2-butene-1,4-diol, trimethylolpropane monoallylether, glycerin monoallylether. Preferably, but not necessary, said stiff segments have a molecular weight of from about 30 to about 1,000. The average number of said stiff segments per molecule of polyurethane is preferably comprised between 30 to 800. The number of olefinic double bonds in said stiff segments is preferably from 30 to 200 per molecule of polyurethane.

The stiff-type segments can be derived in part also from the use of a short-chain saturated diol.

As saturated diols, the following are utilizable: ethylene glycol, 1,4-butandiol, 1,6-hexandiol, 1,4-di-β-hydroxyethylhydroquinone, 1,4-bis(hydroxymethyl)-cyclohexane, telomers of $C_2F_4$, with both end groups being OH. The fluorinated diol may also contain one or two ethereal oxygen atoms.

Last, the polymeric structure may also contain structural units of the stiff type deriving from the use, as a chain extender, of short-chain diamines such as e.g.: hydrazine, ethylenediamine, hexamethylenediamine, m-phenylenediamine, 3,3'-dichloro-4,4'-diaminodiphenyl methane. In the preparation of the polyurethanes according to the invention, it is possible to use the following diisocyanates of the aliphatic type having up to 12 carbon atoms, for example, hexamethylene diisocyanate, or the cycloaliphatic diisocyanates such as 4,4'-dicyclohexylmethane diisocyanate, cyclohexyl-1,4-diisocyanate, isophorone diisocyanate, or the aromatic diisocyanates such as toluene diisocyanate, xylylene diisocyanate, 4,4'-diphenylmethane diisocyanate, or the fluorinated idisocyanates such as tetrafluorophenylene diisocyanate or 6-chloro-2,4,5-trifluorobenzene-1,3-diisocyanate.

In the preparation of the polyurethanes according to the present invention is it possible to use, in admixture with the above saturated and unsaturated diols, also the "polyether" polyols or the "polyester" polyols (i.e. α, ω-polyoxyalkylene-diols or α, ω-polyester-diols), such as, for example: polyethylene glycol, poly(propylene glycol), (poly(tetramethylene glycol), poly(1,4-butandiol adipate), poly(hexandiol-1,4-butandiol adipate), poly(1,6-hexandiol-neopentyl glycol adipate), poly(ε-caprolactone), poly(1,6-hexandiol carbonate).

Synthesis of the Polymeric materials

The vulcanized fluorinated polyurethanes forming the object of the present invention are prepared starting from high molecular weight linear polyurethanes having the structure described above and containing double bonds of the olefinic type, which play an active role in the radicalic vulcanization system. These are then formulated with a proper cross-linking agent to provide a vulcanized finished product.

Synthesis of the linear polymer

Preferably, but not in a way strictly necessary, said linear polyurethanes have molecular weight of from 30,000 to 200,000.

It is prepared by operating in two steps. The first step consists in preparing a prepolymer: the perfluoropolyethereal diol, dissolved in a proper solvent, is reacted with the hydrogenated diisocyanate in excess, thereby obtaining a terminated isocyanate prepolymer. This step can be eliminated if the perfluoropolyether-structure diisocyanate is utilized. The starting product, namely perfluoropolyethereal diol or perfluoropolyethereal diisocyanate is a compound which is well known, for example, U.S. Pat. no. 3,810,874, hereby incorporated by reference.

The second step is conducted by reacting the isocyanic prepolymer or the fluorinated diisocyanate having PFPE structure with a mixture composed of:
a diol or a short-chain diamine,
a short-chain unsaturated diol.

In such a mixture the difunctional saturated compound/unsaturated diol molar ratio may range from about 0 to 10, preferably from 0 to 3.

The reaction may be conducted either in solution or in mass. In the former case, the solution of the isocyanic prepolymer or the perfluoropolyethereal diisocyanate dissolved in a proper solvent is reacted at 20°-70° C. with the unsaturated diol or with the mixture of saturated and unsaturated diols so that the NCO/OH(NH) groups ratio be equal to about 1, for a stretch of time varying from 1 to 8 hours. The reaction is followed by I.R. spectroscopy, checking the disappearance of the NCO band at 2270 cm$^{-1}$. On conclusion of the reaction, the polymer is precipitated in an excess of $H_2O$ and after a few further washings with $H_2O$ it is filtered and dried under vacuum.

In the latter case, the isocyanic prepolymer, after removal of the solvent, or the fluorinated diisocyanate is reacted at 20°-120° C, with the unsaturated diol or the mixture of saturated and unsaturated diols already described herein to have a NCO/OH(NH) groups ratio equal to 1-1.05, for a stretch of time varying from 1 to 8 hours. The reaction is followed using I.R. spectroscopy, in like manner as in the preceding step. At the end of the reaction, the highly viscous polymeric mass is extruded and pelletized.

The efficiency of the linear polyurethane synthesis reaction can be increased by adding a proper catalyst system, for example, tin derivatives such as dibutyl tin dilaurate, dibutyl tin acetate, dibutyl tin oxide, iron derivatives such as iron acetylacetonate, titanium alcoholates such as titanium tetraisopropylate, tertiary amines such as triethylamine or N-methyl morpholine in amounts ranging from 0.001 to 2% by weight, preferably from 0.01 to 0.5% by weight, referred to the total weight.

Mixing and vulcanization

The urethane polymer so obtained is formulated with the cross-linking agent and optionally with other additives by operating in a calender or in a closed mixer (Banbury).

The cross-linking agent amount varies as a function of the type of agent utilized:
in the vulcanization with peroxides, it is operated with a peroxide amount ranging from about 1 to 10 p.h.r., preferably from 2 to 5 p.h.r.;
in the vulcanization with sulphur, it is operated with a sulphur amount ranging from about 1 to 5 p.h.r., preferably from 1.5 to 2 p.h.r.

In the vulcanization with peroxides, the selection of the peroxide depends on the conditions and the temperature at which it will be operated.

Most commonly utilized peroxides are: 2,5-dimethyl-2,5-di(t-butylperoxy)hexane; $\alpha,\alpha''$-bis-(t-butyl-peroxy)-diisopropylbenzene; 1,1-di(t-butylperoxy)-3,3,5-trimethylcyclohexane; di-terbutylperoxide; dicumylperoxide.

The vulcanization reaction rate can be regulated by the addition of accelerants or retardants, depending on the processing requirements.

Cross-linking can be obtained also by treatment with ultraviolet rays or with an electron beam.

The fluorinated polyurethanes of the present invention are elastomers which are chacterized, in the vulcanized state, by the following properties:
excellent flexibility at very low temperatures, even lower than $-100°$ C.;
resistance to hydrolytic degration and to the attack of the most usual chemical agents, of the oils and fuels;
surface characteristics of smoothness (self-lubrication) and of oil- and water-repellency.

The fluorinated polyurethanes can be formulated by adding to them conventional fillers and pigments, for example, antioxidants, U.V. stabilizers, and reinforcing fillers such as carbon black, stearic acid, graphite, etc. Furthermore, because they have a sufficient fluorine content, they are compatible with fillers of the type of the fluorinated polymers, in particular, polytetrafluoroethylene.

The fluorinated polyurethanes of the present invention are utilizable for structural elements such as gaskets, couplings, components for valves and fittings, insulating and protective membranes, adhesives, sealing materials, where utmost severe operating conditions are used and in particular the elastomeric properties are to be retained at very low temperatures (arctic rubbers).

Applicable sectors of particular interest are, therefore, the aeronautical, aerospace, oil, chemical industry, and the like.

Last, another applicable field of particular interest is that of the structural materials to be utilized in the biomedical sector, for the manufacture of artificial organs, artificial blood-vessels, and membranes Structural materials which must exhibit excellent mechanical properties antithrombosis characteristics and resistance to degration are other uses.

EXAMPLES

The following examples are given merely to illustrate the present invention without being however a limitation of the possible embodiments thereof.

The fluorinated polyurethanes described in the examples have been characterized according to the following standards:

| Hardness (Shore A) | ASTM 2240 |
|---|---|
| Tensile strength (MPa) | ASTM D 412 |
| Elongation at break (%) | ASTM D 412 |
| Friction coefficient | ASTM D 1894 |
| Contact angle | ATICELCA MC 21-72 |
| ODR curve | ASTM D 2084 |

EXAMPLE 1

This example relates to the preparation of a high molecular weight linear polyurethane. The synthesis was conducted in two steps.

A) Synthesis of the NCO-terminated prepolymer by reaction of PFPE diol with a diisocyanate.

A perfluoropolyether of type Fomblin Z DOL ® with $-CH_2OH$ end groups, having an equivalent weight of 2103 and represented by formula: $HOCH_2CF_2(CF_2CF_2O)_m(CF_2O)_nCF_2CH_2OH$ with $m/n=0.7$, was reacted with 4,4'-dicyclohexylmethane diisocyanate. The reaction was conducted in solution by dissolving 11 g of diisocyanate in 80 cc of Freon 113. The temperature was brought to 50° C. In a nitrogen atmosphere, 89 g of diol were dropped The reaction was carried on maintaining this temperature until reaching, after 4 hours, the desired degree (1.78% by weight of NCO groups). The reaction mixture was then cooled to stop the reaction.

B) Chain extension step.

A solution of 100 g of prepolymer dissolved in 80 cc of Freon 113 was heated to 50° C in a nitrogen atmosphere. To this solution, a solution of 1.9 g of cis-2-butene-1,4-diol dissolved in 20 cc of THF was added dropwise. The reaction was controlled by I.R. spectroscopy, following the trend of the $-NCO$ band at 2270 cm$^{-1}$. After 8 hours, once the desired polymerization degree had been reached, the polymer was precipitated in $H_2O$ to hydrolyze the residual NCO end groups and to obtain a stable polymer. On conclusion, a polymer in the form of a granular white solid was obtained.

EXAMPLES 2-6

Following the procedure described in example 1, a series of linear polyurethanes was prepared.

As perfluoropolyethereal diols, the following were used:
a PFPE of the type of Fomblin Z DOL 4000 ® with $-CH_2OH$ end groups, having an equivalent weight = 2103;
a PFPE of the type of Fomblin Z DOL 4000 Tx with $-CH_2CH_2OH$ end groups, having an equivalent weight = 2260.

As diisocyanates, the following were used:
4,4'-dicyclohexylmethane diisocyanate ($H_{12}MDI$);

isophorone diisocyanate (IPDI).

The chain extension was effected by using mixtures of 1,4-butandiol and cis-2-butene-1,4-diol having different %-composition.

Table 1 shows the different formulations, expressed in moles:

TABLE 1

| Examples | Z DOL 4000 | Z DOL 4000 Tx | H12MDI | IPDI | BDO | BenDO |
|---|---|---|---|---|---|---|
| 1 | 1 | | 2 | | | 1 |
| 2 | 1 | | 2 | | | 1 |
| 3 | — | 1 | 2 | | 0.5 | 0.5 |
| 4 | — | 1 | 2 | | 0.25 | 0.75 |
| 5 | — | 1 | 1.6 | | — | 0.6 |
| 6 | — | 1 | — | 2 | — | 1 |

BDO = 1,4-butandiol
BenDO = cis-2-butene-1,4-diol.

EXAMPLES 7-13

These examples illustrate the cross-linking of a series of polyurethanes according to the invention. These polyurethanes were prepared by formulating one of the linear polymers of the preceding examples with a peroxide in a collander or in a mixer. As peroxides, the following were used:

α,α'-bis-(t-butylperoxy)m/p-diisopropylbenzene (Peroximon F/R);

1,1-di-(t-butylperoxy)-3,3,5-trimethylcyclohexane (Peroxidimon S164/4OP).

After having determined the cross-linking trend using the ODR curve, the samples were introduced into 120×120×2 mm molds and then molded using of a plate press. The resulting little plate was utilized to determine the mechanical properties.

The data relating to the various formulations are reported in Table 2.

TABLE 2

| Examples | Linear polymer (ref. ex.) | Peroxide (p.h.r.) | Cross-linking conditions | D (Shore A) | M 100% (Kg/cm²) | CR (Kg/cm²) | AR (%) | Tg (°C.) |
|---|---|---|---|---|---|---|---|---|
| 7 | 1 | S164/40P (5 phr) | 24'/140° | 67 | 41 | 47 | 120 | −113 |
| 8 | 2 | S164/40P (5 phr) | 20'/140° | 60 | 23 | 46 | 250 | −112 |
| 9 | 3 | S164/40P (2,5 phr) | 40'/140° | 69 | 36 | 58 | 216 | −112 |
| 10 | 3 | F/R (2 phr) | 30'/160° | 72 | 43 | 58 | 160 | −112 |
| 11 | 4 | S164/40P (2.5 phr) | 30'/140° | 72 | 46 | 67 | 200 | −110 |
| 12 | 5 | S164/40P (5 phr) | 30'/140° | 66 | 29 | 40 | 150 | −109 |
| 13 | 6 | S164/40P (6.5 phr) | 24'/140° | 67 | 28 | 68 | 300 | −111 |

EXAMPLE 14

The modulus values as a function of the temperature, obtained form the dynamic-mechanical spectrum of the vulcanized polyurethanes according to examples 7 and 9 are reported below. The values evidence a constant trend in a broad temperature range.

TABLE 3

| Examples | Modulus (N/mm²) Temperature (°C.) | | | |
|---|---|---|---|---|
| | −90 | −20 | +20 | +120 |
| 7 | 6.0 | 6.0 | 5.2 | 5.0 |

TABLE 3-continued

| Examples | Modulus (N/mm²) Temperature (°C.) | | | |
|---|---|---|---|---|
| | −90 | −20 | −20 | −120 |
| 9 | 4.8 | 5.0 | 4.8 | 4.0 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. Fluorinated polyurethanes having a glass transition temperature lower than −80° C. and comprising perfluoropolyethereal-structure blocks exhibiting an average molecular weight ranging from about 1,000 to 10,000 and rubber-like properties, alternated with structural units of the stiff type, the units of the stiff type being at least, in part, provided with a double bond of the olefinic type, which is suited to give rise to cross-linking of the polymeric chains with a cross-linking system of the radicalic type, the polyurethanes being prepared using diisocyanates of the aliphatic, cycloaliphatic, or aromatic type, or perfluoropolyether diisocyanates.

2. Fluorinated polyurethanes according to claim 1, wherein they are susceptible of being processed according to conventional methods adopted for vulcanizable rubbers.

3. Fluorinated polyurethanes according to claim 1 wherein the polyurethane is vulcanized using vulcanizing agents selected from peroxides and sulphur or using treatment with U.V. rays or with an electron beam, characterized by:

Tg less than −80° C.;
hardness ranging from 50 Shore A to 75 Shore D;
tensile strength greater than 30 kg/cm²;
limited variation of the modulus of elasticity in the temperature range from −100° C. to +150° C.

4. Fluorinated polyurethanes according to claim 1 wherein the perfluoropolyethereal structure blocks consist of random distribution sequences of fluorooxyalkylene units selected from:

I) $(CF_2CF_2O)$ and $CF_2O$;
II)

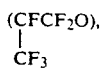

$CF_2CF_2O$), (CFXO) where X is F or $CF_3$;

III) ($CH_2CF_2CF_2O$) in structures represented by the following formula:

—($OCF_2CF_2CH_2$)pO R'$_f$O ($CH_2CF_2CF_2O$)p where R' is a fluoroalyphatic group containing from 1 to 21 carbon atoms, which can contain in the chain one or more heteroatoms, p and q are integers, p+q being greater than 2, $R_f$, p and q being such that the molecular weight is in the above limits;

IV)

the units being bound to each other in the perfluoropolyethereal chain as follows:

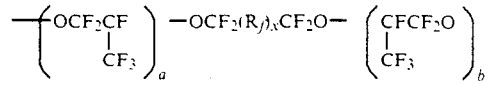

wherein $R_f$ is a fluoroalyphatic group containing from 1 to 21 carbon atoms, which can contain in the chain one or more heteroatoms, x is 0 or 1, a and b are integers, a+b is greater than 2, $R_f$, x, a and b being such that the molecular weight is within the above range;

V) —$CF_2CF_2$— or —$CF_2CF_2CF_2$— or —$CF(CF_3)CF_2$— units deriving from perfluoropolyethers prepared using a scission process according to U.S. Pat. No. 4,720,527.

5. Fluorinated polyurethanes according to claim 1, wherein the stiff-type units are derived from a short-chain unsaturated diol and optionally also from a saturated diol or a short-chain diamine.

6. Fluorinated polyurethanes according to claim 1, wherein the stiff-type units containing a double bond are derived from the use of an unsaturated diol selected from: 2-butene-1,4-diol, trimethylolpropane monoallylether, glycerinmonoallylether.

* * * * *